(12) United States Patent
Furuta

(10) Patent No.: US 11,062,456 B2
(45) Date of Patent: Jul. 13, 2021

(54) IMAGING ANALYZER

(71) Applicant: SHIMADZU CORPORATION, Kyoto (JP)

(72) Inventor: Tetsuro Furuta, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 91 days.

(21) Appl. No.: 16/671,237

(22) Filed: Nov. 1, 2019

(65) Prior Publication Data

US 2020/0184650 A1  Jun. 11, 2020

(30) Foreign Application Priority Data

Dec. 11, 2018 (JP) .............................. JP2018-231434

(51) Int. Cl.
*G06T 7/11* (2017.01)
*G06T 7/70* (2017.01)
*H01J 49/00* (2006.01)

(52) U.S. Cl.
CPC ................. *G06T 7/11* (2017.01); *G06T 7/70* (2017.01); *H01J 49/0036* (2013.01); *G06T 2207/10056* (2013.01); *G06T 2207/30024* (2013.01)

(58) Field of Classification Search
CPC ..... G06T 7/11; G06T 7/62; G06T 7/70; G06T 9/20; G06T 9/005; G06T 2207/30024; (Continued)

(56) References Cited

U.S. PATENT DOCUMENTS

2004/0129876 A1* 7/2004 Franzen ................... H01J 49/16
                                                    250/288
2012/0209854 A1* 8/2012 Ikegami ............... H03M 7/3059
                                                    707/741

(Continued)

FOREIGN PATENT DOCUMENTS

WO  2018/037491 A1  3/2018

OTHER PUBLICATIONS

"iMScope Trio Imaging Mass Microscope", Shimadzu Corporation, 4 page the Internet <URL: https://www.shimadzu.com/an/lifescience/imaging/imscope.html>, Nov. 20, 2018.

*Primary Examiner* — Nay A Maung
*Assistant Examiner* — Jose M Torres
(74) *Attorney, Agent, or Firm* — Sughrue Mion, PLLC

(57) ABSTRACT

A control target area determiner 21 sets a rectangular target area surrounding a measurement area specified on an optical microscopic image of a sample. A validity determiner 22 and binarization processor 23 divide all small areas within the target area into a first group which overlaps the measurement area and a second group which does not overlap, and assign valid flag "1" and invalid flag "0" to the first and second groups, respectively. A compression processor 24 reads individual flag data in a predetermined order on all small areas within the target area, creates a binary-data string, and compresses the string by run length encoding. A control-processing unit 2 sends the compressed data to a main apparatus 1 along with other data, including information indicating the position of the first small area within the target area. The main apparatus 1 performs an analysis while gradually decoding those data.

6 Claims, 4 Drawing Sheets

(58) Field of Classification Search
CPC . G06T 2207/10056; G06T 2207/30096; H01J 49/0036; G01N 27/62; G01N 27/64; G01N 35/00584
See application file for complete search history.

(56) References Cited

U.S. PATENT DOCUMENTS

| | | | | |
|---|---|---|---|---|
| 2014/0316717 | A1* | 10/2014 | Ikegami | H01J 49/0036 702/23 |
| 2017/0077949 | A1* | 3/2017 | Wheeler | H03M 7/4037 |
| 2019/0272984 | A1 | 9/2019 | Takeshita | |

* cited by examiner

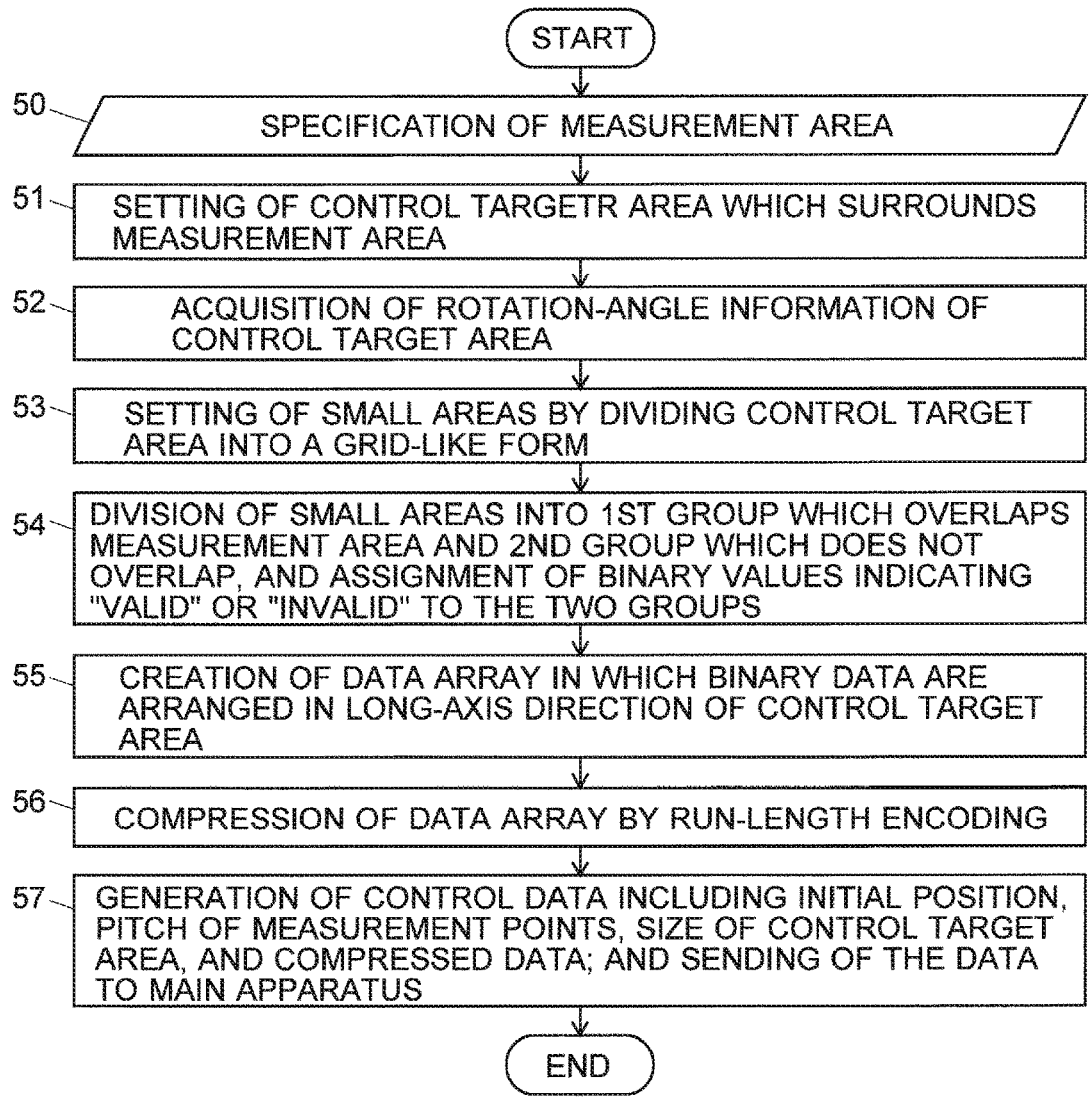

Fig. 2

- 50: SPECIFICATION OF MEASUREMENT AREA
- 51: SETTING OF CONTROL TARGETR AREA WHICH SURROUNDS MEASUREMENT AREA
- 52: ACQUISITION OF ROTATION-ANGLE INFORMATION OF CONTROL TARGET AREA
- 53: SETTING OF SMALL AREAS BY DIVIDING CONTROL TARGET AREA INTO A GRID-LIKE FORM
- 54: DIVISION OF SMALL AREAS INTO 1ST GROUP WHICH OVERLAPS MEASUREMENT AREA AND 2ND GROUP WHICH DOES NOT OVERLAP, AND ASSIGNMENT OF BINARY VALUES INDICATING "VALID" OR "INVALID" TO THE TWO GROUPS
- 55: CREATION OF DATA ARRAY IN WHICH BINARY DATA ARE ARRANGED IN LONG-AXIS DIRECTION OF CONTROL TARGET AREA
- 56: COMPRESSION OF DATA ARRAY BY RUN-LENGTH ENCODING
- 57: GENERATION OF CONTROL DATA INCLUDING INITIAL POSITION, PITCH OF MEASUREMENT POINTS, SIZE OF CONTROL TARGET AREA, AND COMPRESSED DATA; AND SENDING OF THE DATA TO MAIN APPARATUS

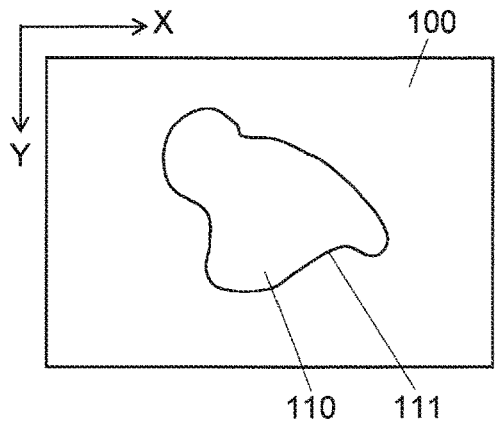

Fig. 3A

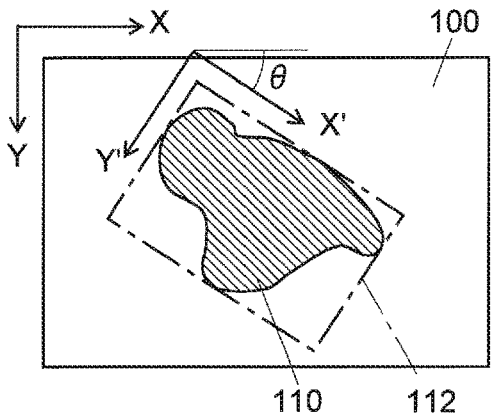

Fig. 3B

Fig. 6
| VALID / INVALID | NUMBER OF CONTINUOUS OCCURRENCES | HEX | binary |
|---|---|---|---|
| 0 | 1 | 01 | → 0000 0001 |
| 1 | 2 | 82 | → 1000 0010 |
| 0 | 2 | 02 | |
| 1 | 9 | 89 | |
| 0 | 2 | 02 | |
| 1 | 62 | BE | |
| 0 | 5 | 05 | |
| 1 | 26 | 9A | |
| 0 | 7 | 07 | |
| 1 | 8 | 88 | |
| 0 | 9 | 09 | |
| 1 | 7 | 87 | |
| 0 | 8 | 08 | |
| 1 | 6 | 86 | |
| 0 | 12 | 0C | |
| 1 | 5 | 85 | |
| 0 | 5 | 05 | |
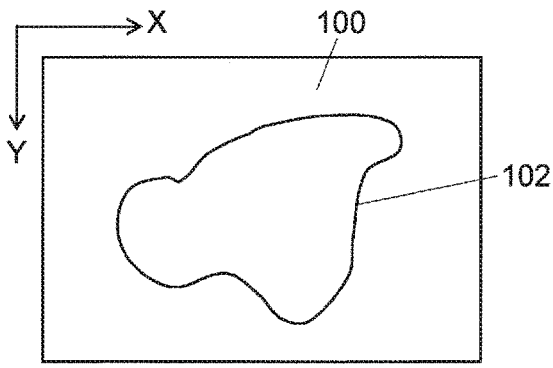
Fig. 7A
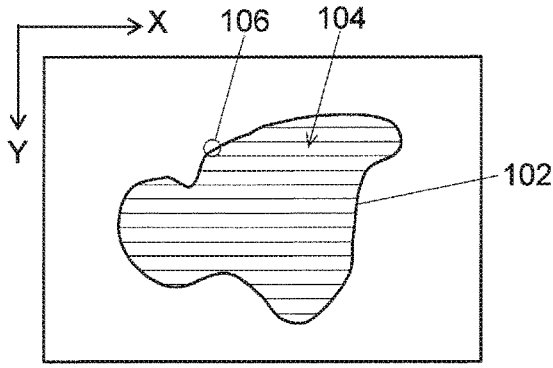
Fig. 7B
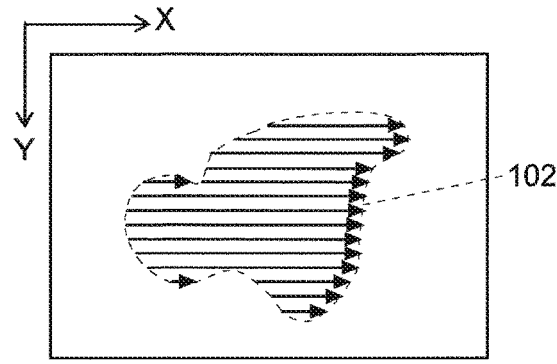
Fig. 7C

IMAGING ANALYZER

TECHNICAL FIELD

The present invention relates to an imaging analyzer capable of carrying out a predetermined analysis on each of a considerable number of micro areas within a measurement area on a sample. The present invention is particularly suited for an imaging mass spectrometer.

BACKGROUND ART

Mass spectrometric imaging is a technique in which a mass spectrometric analysis is performed on each of the micro areas (measurement points) within a two-dimensional measurement area on a sample, such as a biological tissue section, to investigate a spatial distribution of a substance having a specific mass. Intensive efforts have been made to apply this technique in various areas, such as the drug discovery, biomarker search, as well as identification of the causes of diseases. Mass spectrometers used for performing mass spectrometric imaging are generally called "imaging mass spectrometers" (see Patent Literature 1 or other related documents).

An imaging mass spectrometer is normally equipped with an optical microscopic device capable of taking an optical microscopic image of a surface area of a sample. An observer initially examines an optical image of the surface area of the sample acquired with the optical microscopic device to determine a measurement area to be subjected to a mass spectrometric analysis. Then, the observer specifies the measurement area and issues a command to execute the measurement. Upon receiving this command, the imaging mass spectrometer sequentially performs the mass spectrometric analysis for a considerable number of micro areas included in the specified measurement area.

For example, an imaging mass spectrometer disclosed in Non-Patent Literature 1 includes a main apparatus for performing an analysis and a personal computer (which is hereinafter abbreviated as the "PC") on which dedicated software is installed for controlling the operation of the main apparatus as well as processing data acquired with the main apparatus.

In the case where an area having an appropriate shape has been specified as a measurement target on a sample, a conventional imaging mass spectrometer operates as follows to perform an analysis.

Consider the situation in which an observer has specified a measurement area 102 having an arbitrary shape on an optical microscopic image 100 of a sample, as shown in FIG. 7A. Upon receiving this specification of the measurement area 102, the PC divides the measurement area 102 into a plurality of strip-like zones 104 extending along the X axis and having a width corresponding to the size of a single micro area in the Y-axis direction (see FIG. 7B). For each strip-like zone 104, the PC determines the position information of the starting point 106 (address information in the X and Y-axis directions), interval of the measurement points in the X-axis direction (size of one micro area in the X-axis direction), as well as number of measurement points (number of micro areas) in the strip-like zone 104, and sends a set of control data including those pieces of information to the main apparatus. Upon receiving the control data corresponding to one strip-like zone 104, the main apparatus determines the position of the micro area to be subjected to the analysis according to the information included in the control data, and sequentially performs a mass spectrometric analysis on a plurality of micro areas (in some cases, there is only one micro area) in one strip-like zone 104.

While monitoring the execution status of the analysis in the main apparatus, the PC repeats a control operation in which the control data corresponding to the next strip-like zone 104 are sent to the main apparatus every time the analysis on the micro areas included in one strip-like zone 104 has been completed. By such an operation, the main apparatus can perform the mass spectrometric analysis for all micro areas included in the specified measurement area (see FIG. 7C) and transfer the acquired mass spectrometric data to the PC.

CITATION LIST

Patent Literature

Patent Literature 1: WO 2018/037491 A1

Non Patent Literature

Non Patent Literature 1: "iMScope TRIO Imaging Mass Microscope", [online], Shimadzu Corporation, [accessed on Nov. 20, 2018], the Internet

SUMMARY OF INVENTION

Technical Problem

If the resolution of the mass spectrometric imaging graphic is increased, the number of strip-like zones 104 included in the measurement area 102 may become extremely large. Therefore, the amount of control data corresponding to the entire measurement area 102 may become considerably large. It is practically difficult to equip the main apparatus with a high-capacity memory that can hold all of those control data. Therefore, in order to suppress the capacity of the memory installed in the main apparatus, the sending of the control data from the PC to the main apparatus is performed for each strip-like zone in the previously described manner by transmitting the control data corresponding to one strip-like zone, while the main apparatus is configured to store only the control data corresponding to one strip-like zone in the memory and determine the position of the micro areas to be subjected to the analysis from this control data.

However, according to such a control method, the PC needs to frequently check the operation status of the main apparatus and sends control data to the main apparatus every time a plurality of analyses for one strip-like zone are executed while individually performing a series of analyses for the enormous number of micro areas included in one measurement area 102. Accordingly, the processing in the PC becomes complex. Additionally, the highly frequent transmission/reception of the control data between the PC and the main apparatus lowers the rate at which the mass spectrometric data acquired with the main apparatus are transferred to the PC. This may cause the period of time for the analysis of the entire measurement area to be considerably long.

The previously described problem is not limited to the imaging mass spectrometer. A similar problem also occurs in an imaging device which employs an analyzing technique different from mass spectrometry, such as an infrared spectroscopic imaging device or Raman spectroscopic imaging device, and particularly, when the spatial resolving power of the analysis needs to be increased.

The present invention has been developed to solve such a problem. Its objective is to provide an imaging analyzer which makes it unnecessary to perform regular or frequent monitoring of the status of the main apparatus and transmission/reception of the control data in a PC or similar control unit which controls the main apparatus, while avoiding an increase in the capacity of the memory for holding the control data in the main apparatus.

Solution to Problem

The imaging analyzer according to the present invention developed for solving the previously described problem is an imaging analyzer for performing a predetermined analysis on each of a plurality of micro areas within a measurement area specified on a sample. The imaging analyzer includes a main apparatus for executing a predetermined analysis on a sample, and a control unit for generating control data necessary for the analysis in the main apparatus and for sending the control data to the main apparatus. The control unit includes:

a measurement area setter configured to set a measurement area having an arbitrary shape;

a control target area determiner configured to determine, for the measurement area set by the measurement area setter, a control target area with a predetermined shape surrounding the measurement area and having a variable size;

a binarization processor configured to divide all micro areas included in the control target area into a first group composed of micro areas which are entirely or partially included in the measurement area and a second group composed of micro areas which do not belong to the first group, and assign one value of binary data to the micro areas belonging to the first group and the other value of the binary data to the micro areas belonging to the second group;

a compression processor configured to obtain, in a predetermined order, the individual binary data assigned to all micro areas included in the control target area, combine the obtained binary data into a binary-data string, and compress the binary-data string by run length encoding; and a data sender configured to create control data and send the control data to the main apparatus, the control data including initial position information indicating the position of the first micro area from which the binary-data string is created by the compression processor as well as the compressed data created by the compression processor, and the main apparatus includes:

an analysis execution controller configured to locate the micro areas corresponding to the measurement area on the sample and sequentially execute an analysis on those micro areas, based on control information including the initial position information and the binary-data string restored by expanding the compressed data in the control data sent from the control unit.

Advantageous Effects of Invention

In the imaging analyzer according to the present invention, the information based on which the position of the micro areas included in the measurement area can be located is compressed into a smaller amount of information when it is sent from the control unit to the main apparatus. Therefore, in the imaging analyzer according to the present invention, it is unnecessary to perform regular or frequent monitoring of the status of the apparatus and transmission/reception of the control data in a PC or similar control unit. An increase in the capacity of the memory for holding the control data in the main apparatus can also be avoided.

BRIEF DESCRIPTION OF DRAWINGS

FIG. 2 is a process flowchart of a control PC in the imaging mass spectrometer according to the present embodiment.

FIGS. 3A and 3B are diagrams illustrating the processing for an analysis control carried out by the control PC.

FIG. 6 is a diagram illustrating the processing for an analysis control carried out by the control PC.

FIGS. 7A-7C are diagrams illustrating the processing for an analysis control carried out by a control PC in a conventional imaging mass spectrometer.

DESCRIPTION OF EMBODIMENTS

An imaging mass spectrometer as one embodiment of the present invention is hereinafter described with reference to the attached drawings.

Figure 1:
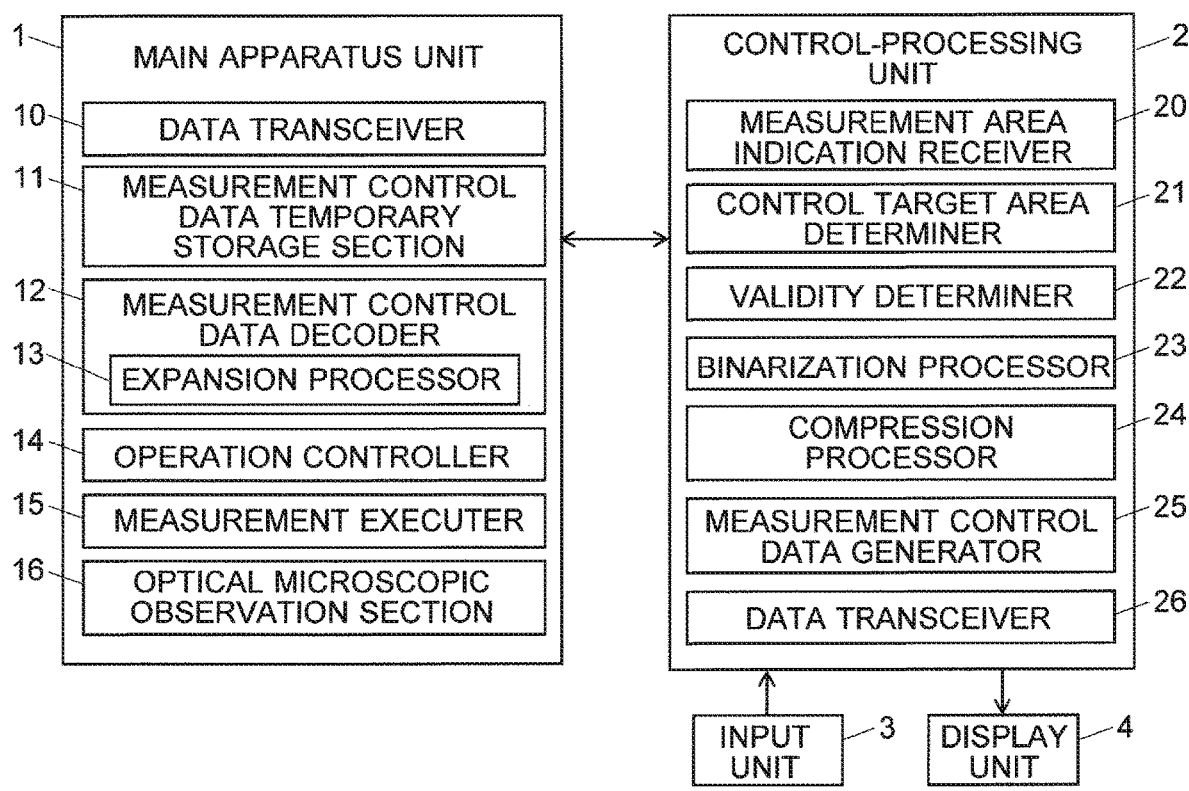
FIG. 1 is a configuration diagram of the main components of an imaging mass spectrometer as one embodiment of the present invention.

FIG. 1 is a configuration diagram of the main components of the imaging mass spectrometer according to the present embodiment. The present device includes: a main apparatus unit 1 for performing a measurement; a control-processing unit 2 for controlling the operation of the main apparatus unit 1 and processing data acquired with the main apparatus unit 1; an input unit 3; and a display unit 4. The main apparatus unit 1 and the control-processing unit 2 are connected to each other through a signal line through which data can be sent in both directions. The input unit 3 and the display unit 4 are annexed to the control-processing unit 2. Typically, the control-processing unit 2 is a personal computer (PC), on which various functions (which will be described later) can be realized by executing, on the PC, dedicated software installed on the PC.

The main apparatus unit 1 includes a data transceiver 10, measurement control data temporary storage section 11, measurement control data decoder 12, operation controller 14, measurement executer 15 and optical microscopic observation section 16. The measurement control data decoder 12 includes an expansion processor 13. The control-processing unit 2 includes a measurement area indication receiver 20, control target area determiner 21, validity determiner 22, binarization processor 23, compression processor 24, measurement control data generator 25, and data transceiver 26.

The measurement executer 15 in the main apparatus unit 1 includes, for example, a matrix-assisted laser desorption/ionization ion-trap time-of-flight mass spectrometer (MALDI-IT-TOFMS) and can acquire mass spectrum data (or $MS^n$ spectrum data, where n is an integer equal to or greater than two) for each of a considerable number of measurement points (micro areas) within a two-dimensional measurement area on a sample, such as a biological tissue section. The optical microscopic observation section 16 is used for acquiring an optical microscopic image of a predetermined range on the same sample.

Next, a characteristic operation in the imaging mass spectrometer according to the present embodiment is described with reference to FIGS. 2-6. FIG. 2 is a flowchart of the processing performed by the control-processing unit 2. FIGS. 3A-6 are diagrams illustrating the processing for an analysis control carried out by the control-processing unit 2.

A user (observer) sets a sample at a predetermined position in the main apparatus unit 1. The optical microscopic observation section 16 takes an optical microscopic image of the predetermined range on the sample. The acquired image data is sent to the control-processing unit 2. The control-processing unit 2 displays the image on the display unit 4. The user visually checks the displayed optical microscopic image and determines a measurement area on the sample within which he or she wants to investigate an ion intensity distribution, or the distribution of a specific kind of component. Then, the user operates the input unit 3 to draw a frame 111 having an arbitrary shape on the optical microscopic image 100, as shown in FIG. 3A for example, and specifies the portion surrounded by the frame 11 as the measurement area 110 (Step 50). The measurement area indication receiver 20 sets the thus specified area as the measurement area. It should be noted that the horizontal and vertical axes of the optical microscopic image 100 are respectively defined as the X and Y axes for convenience, as shown in FIG. 3A.

The control target area determiner 21 determines a rectangular control target area 112 surrounding the measurement area 110 on the optical microscopic image 100 (Step 51). There are practically innumerable rectangular control target areas that surround the measurement area 110. Among those possible rectangles surrounding the measurement area 110, a rectangle which is sized so as to achieve the highest possible proportion of the area possessed by the measurement area 110 in the rectangle should preferably be set as the control target area 112. The long and short sides of this rectangle do not need to be parallel to the X or Y axis. In many cases, if the control target area 112 is determined under these conditions, the frame of the control target area 112 will be in contact with the frame 111 of the measurement area 110 over a considerable length or at a considerable number of points. Needless to say, the control target area 112 does not always need to be a rectangle having the maximized proportion of the area possessed by the measurement area 110 among the rectangles surrounding this measurement area 110.

For example, a control target area 112 as shown in FIG. 3B is determined for the measurement area 110 shown in FIG. 3A. An axis parallel to the long side of the rectangular frame of the control target area 112 is hereinafter defined as the X' axis, while an axis parallel to the short side is defined as the Y' axis. Since the X' and X axes are not parallel to each other, the control target area determiner 21 obtains the angle $\theta$ formed by the X' and X axes as the rotation-angle information of the control target area 112 (Step 52).

Figure 4:
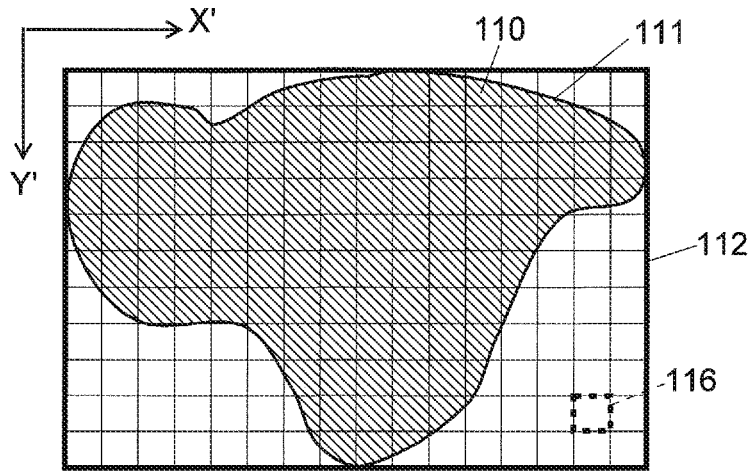
FIG. 4 is a diagram illustrating the processing for an analysis control carried out by the control PC.

As shown in FIG. 4, the validity determiner 22 divides the entirety of the rectangular control target area 112 into a grid-like form at predetermined intervals (Step 53). The intervals of the grid in the X' and Y'-axis directions are determined according to the intervals of the measurement points for the mass spectrometric analysis, i.e. the spatial resolving power specified beforehand. Accordingly, one rectangular small area 116 in the grid corresponds to one micro area on which the mass spectrometric analysis is to be performed. For each small area 116 within the control target area 112, the validity determiner 22 determines whether or not the small area overlaps the measurement area 110. A small area which at least partially overlaps the measurement area 110 is sorted into the first group, whereas a small area which does not overlap at all is sorted into the second group.

Figure 5:
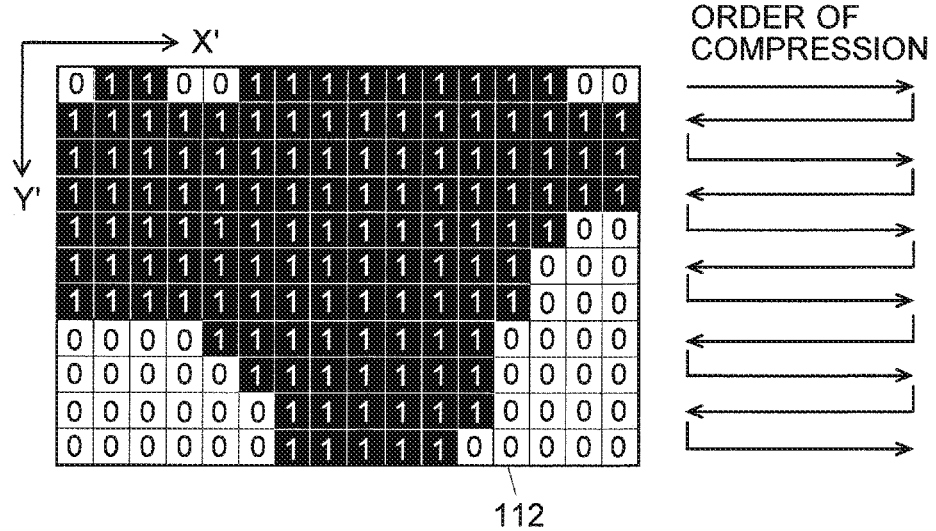
FIG. 5 is a diagram illustrating the processing for an analysis control carried out by the control PC.

The binarization processor 23 assigns the first group of small areas a flag of "1" which indicates that these areas are valid, and also assigns the second group of small areas a flag of "0" which indicates that these areas are invalid (Step 54). FIG. 5 shows the valid/invalid flags assigned to the individual small areas 116 shown in FIG. 4.

The compression processor 24 creates a data array in which the flag values individually assigned to the small areas are sequentially arranged. This array is created by repeating the successive steps of reading the flag values in one row or column along the longitudinal axis of the control target area 112 (which is the X' axis in the example of FIG. 5), shifting to the next row or column after reaching the end of the former row or column, and reading the flag values along the longitudinal axis in the opposite direction. The compression processor 24 subsequently compress this data array by run length encoding to obtain compressed data (Steps 55 and 56). In the example of FIG. 5, provided that the small area at the upper-left end is the starting point, the data array of the flag will be 01100111111111001 . . . . Run length encoding of this array yields compressed data as shown in FIG. 6. In FIG. 6, the most significant bit of the two-digit HEX code (which corresponds to 8 bits in binary code) represents the flag value, and the remaining bits represent the number of continuous occurrences of "0" or "1". Although this depends on the spatial resolving power, it is normally expected that the number of continuous occurrences of the same value of the flag will be even larger. Therefore, in practice, the number of bits of one piece of data obtained through the run length encoding should be set at an even larger number.

After the completion of the compressing process, the measurement control data generator 25 creates control data in a predetermined format which includes the following items: information concerning the initial position within the control target area 112 on the sample (address on the X and Y axes); size of the control target area 112 (number of small areas in the X' and Y'-axis directions); pitch of the measurement points (size of the small area); angle $\theta$ of the control target area 112; and the compressed data mentioned earlier. The control data are sent through the data transceiver 26 to the main apparatus unit 1 (Step 57). The information concerning the initial position is a piece of information indicating the position of the small area corresponding to the initial point of the compressing process within the control target area 112.

If the spatial resolving power, or the pitch of the measurement points, is fixed beforehand, it is unnecessary to include the information concerning the pitch of the measurement points into the control data. If the control target area 112 for the measurement area 110 is always determined in such a manner that the X' and Y' axes coincide with the X and Y axes, i.e. if the angle $\theta$ is always made to be zero, it is unnecessary to include the information of the angle $\theta$ into the control data.

The data transceiver 10 in the main apparatus unit 1 receives the control data sent from the control-processing unit 2 and temporarily stores the data in the measurement control data temporary storage section 11. The measurement control data decoder 12 sequentially reads the compressed data from the beginning in the control data stored in the measurement control data temporary storage section 11. The expansion processor 13 expands the read data. The result of the expanding process reveals the number of continuous occurrences of the small areas with the "invalid" flag as well as the number of continuous occurrences of the small areas with the "valid" flag. There is no need to perform a mass spectrometric analysis on the small areas with the "invalid" flag. The analysis only needs to be performed on the small areas with the "valid" flag. Based on the data obtained by the expanding process as well as the other items of information included in the control data, the measurement control data decoder 12 calculates the position information (the address on the X and Y axes) of the small areas to be subjected to the mass spectrometric analysis, and sends it to the operation controller 14.

The measurement control data decoder 12 could be configured to collectively calculate the position information for all small areas to be subjected to the mass spectrometric analysis within the control target area 112. However, such a configuration would require a high-capacity memory for holding the calculated position information. To avoid this problem, the measurement control data decoder 12 is configured to gradually calculate the position information of the small areas to be subjected to the mass spectrometry according to the progress of the actual analysis. Based on the information given from the measurement control data decoder 12 in the previously described manner, the operation controller 14 determines the position on the sample at which the next analysis should be performed, and controls the measurement executer 15 so that a mass spectrometric analysis for that position will be performed.

Specifically, the position of the sample is changed so that the next site to be analyzed on the sample is located at the irradiation point of the laser light by the MALDI ion source. After the position-changing operation is completed, pulsed laser light is delivered onto the sample to generate ions originating from the sample. Then, a mass spectrometric analysis for the generated ions is performed. After the completion of the analysis, the position of the sample is once more changed so that the next site to be analyzed on the sample is located at the irradiation point of the laser light. By repeating such operations, the mass spectrometric analysis is sequentially performed on the sample at the positions corresponding to the small areas with the "valid" flag assigned as shown in FIG. 5, i.e. the measurement points covering the entire measurement area 110.

In the previous description, the number of measurement points included in the measurement area 110 is intentionally made to be small for ease of explanation. In practice, there is normally an enormous number of measurement points included in the measurement area 110. Therefore, if the conventional aforementioned method is used, an enormous amount of control data needs to be sent from the control-processing unit to the main apparatus unit in order to perform the mass spectrometric analysis for the entire measurement area 110. By comparison, the imaging mass spectrometer according to the previous embodiment reduces the amount of control data to be sent from the control-processing unit to the main apparatus unit in order to perform the mass spectrometric analysis for the entire measurement area 110. Therefore, the control data can be entirely sent from the control-processing unit 2 to the main apparatus unit 1 in advance of the analysis of the entire measurement area 110, and the main apparatus unit 1 can perform the analysis while gradually decoding the control data.

The imaging mass spectrometer according to the previous embodiment is configured so that the user manually specifies the measurement area while observing the optical microscopic image. The device may alternatively be configured to automatically specify the measurement area. One example is as follows: The user previously sets extraction conditions for the measurement area. An image recognizer extracts a range that satisfies the extraction conditions on the optical microscopic image by image recognition. This range is designated as the measurement area. That is to say, the measurement area may be specified by manual operations or be automatically specified.

In the imaging mass spectrometer according to the previous embodiment, the control target area has a rectangular shape. The control target area is not limited to rectangles but may have a different shape, such as a quadrilateral (not a rectangle), triangle or polygon. Needless to say, it is necessary to previously define the rules for determining the initial position as well as the order of the data for creating the data array in that shape.

The previous embodiment is an example in which the present invention is applied in an imaging mass spectrometer. The analyzing technique is not limited to mass spectrometry but may be a different type of analysis, such as a Fourier transform infrared spectroscopy or Raman spectroscopy. That is to say, the present invention is generally applicable in any type of imaging analyzer configured to perform an analysis on each of a considerable number of measurement points within a measurement area having various shapes specified by a user or automatically set.

The previously described embodiment and its variations are mere examples of the present invention, and any change, modification or addition appropriately made within the spirit of the present invention will naturally fall within the scope of claims of the present application.

An embodiment of the present invention has been described so far with reference to the drawings. In conclusion, various modes of the present invention will be described.

An imaging analyzer according to the first mode of the present invention is an imaging analyzer for performing a predetermined analysis on each of a plurality of micro areas within a measurement area specified on a sample. The imaging analyzer includes a main apparatus for executing a predetermined analysis on a sample, and a control unit for generating control data necessary for the analysis in the main apparatus and for sending the control data to the main apparatus. The control unit includes:

a measurement area setter configured to set a measurement area having an arbitrary shape;

a control target area determiner configured to determine, for the measurement area set by the measurement area setter, a control target area with a predetermined shape surrounding the measurement area and having a variable size;

a binarization processor configured to divide all micro areas included in the control target area into a first group composed of micro areas which are entirely or partially included in the measurement area and a second group composed of micro areas which do not belong to the first group, and assign one value of binary data to the micro areas belonging to the first group and the other value of the binary data to the micro areas belonging to the second group;

a compression processor configured to obtain, in a predetermined order, the individual binary data assigned to all micro areas included in the control target area, combine the obtained binary data into a binary-data string, and compress the binary-data string by run length encoding; and a data sender configured to create control data and send the control data to the main apparatus, the control data including initial position information indicating the position of the first micro area from which the binary-data string is created by the compression processor as well as the compressed data created by the compression processor, and the main apparatus includes:

an analysis execution controller configured to locate the micro areas corresponding to the measurement area on the sample and sequentially execute an analysis on those micro areas, based on control information including the initial position information and the binary-data string restored by expanding the compressed data in the control data sent from the control unit.

Compared to a conventional device, the imaging analyzer according to the first mode requires a smaller amount of control data to be sent from a PC or similar control unit to the main apparatus in order to enable the main apparatus to locate micro areas within a measurement area to be analyzed. The entire set of control data corresponding to the measurement area can be collectively sent to the main apparatus in advance of the analysis. It is unnecessary for the control unit to perform regular or frequent monitoring of the status of the apparatus and transmission/reception of the control data during the analysis. Consequently, the control becomes simpler, and the efficiency of the data transfer between the main apparatus and the control unit becomes higher, which leads to a reduction in analysis time. It is also unnecessary to increase the capacity of the memory for holding the control data in the main apparatus. Therefore, an increase in the cost of the main apparatus can be avoided.

In a second mode of the imaging analyzer, which is a variation of the first mode, the shape of the control target area is a rectangular shape.

The imaging analyzer according to the second mode allows the control target area to be easily set for various shapes of the measurement area.

In a third mode of the imaging analyzer, which is a variation of the second mode, the predetermined order is determined so as to sequentially select the micro areas in the direction of the longitudinal axis of the rectangular control target area.

The third mode of the imaging analyzer increases the possibility of the continuous occurrences of the same value in the binary-data string and enhances the compression efficiency as compared to the case of sequentially selecting the micro areas in the direction of the short axis of the rectangular control target area.

In a fourth mode of the imaging analyzer, which is a variation of any one of the first through modes, the predetermined analysis is a mass spectrometric analysis.

In general, imaging mass spectrometers have higher levels of spatial resolving power than the other types of imaging analyzers. The number of measurement points included in the measurement area is significantly large, and the amount of control data is also correspondingly large. Therefore, the present invention is particularly effective in the fourth mode of the imaging analyzer.

REFERENCE SIGNS LIST

1 . . . Main Apparatus Unit
10 . . . Data Transceiver
11 . . . Measurement Control Data Temporary Storage Section
12 . . . Measurement Control Data Decoder
13 . . . Expansion Processor
14 . . . Operation Controller
15 . . . Measurement Executer
16 . . . Optical Microscopic Observation Section
2 . . . Control-Processing Unit
20 . . . Measurement Area Indication Receiver
21 . . . Control Target Area Determiner
22 . . . Validity Determiner
23 . . . Binarization Processor
24 . . . Compression Processor
25 . . . Measurement Control Data Generator
26 . . . Data Transceiver
3 . . . Input Unit
4 . . . Display Unit
100 . . . Optical Microscopic Image
110 . . . Measurement Area
112 . . . Control Target Area
116 . . . Small Area

The invention claimed is:

1. An imaging analyzer for performing a predetermined analysis on each of a plurality of micro areas within a measurement area specified on a sample, the imaging analyzer including a main apparatus for executing a predetermined analysis on a sample, and a control unit for generating control data necessary for the analysis in the main apparatus and for sending the control data to the main apparatus, wherein:

the control unit includes:
    a measurement area setter configured to set a measurement area having an arbitrary shape;
    a control target area determiner configured to determine, for the measurement area set by the measurement area setter, a control target area with a predetermined shape surrounding the measurement area and having a variable size;
    a binarization processor configured to divide all micro areas included in the control target area into a first group composed of micro areas which are entirely or partially included in the measurement area and a second group composed of micro areas which do not belong to the first group, and assign one value of binary data to the micro areas belonging to the first group and another value of the binary data to the micro areas belonging to the second group;
    a compression processor configured to obtain, in a predetermined order, the individual binary data assigned to all micro areas included in the control target area, combine the obtained binary data into a binary-data string, and compress the binary-data string by run length encoding; and
    a data sender configured to create control data and send the control data to the main apparatus, the control data including initial position information indicating a position of the first micro area from which the binary-data string is created by the compression processor as well as the compressed data created by the compression processor,
and the main apparatus includes:
    an analysis execution controller configured to locate the micro areas corresponding to the measurement area on the sample and sequentially execute an analysis on those micro areas, based on control information including the initial position information and the binary-data string restored by expanding the compressed data in the control data sent from the control unit.

2. The imaging analyzer according to claim 1, wherein the shape of the control target area is a rectangular shape.

3. The imaging analyzer according to claim 2, wherein the predetermined order is determined so as to sequentially select the micro areas in a direction of a longitudinal axis of the rectangular control target area.

4. The imaging analyzer according to claim 3, wherein the predetermined analysis is a mass spectrometric analysis.

5. The imaging analyzer according to claim 2, wherein the predetermined analysis is a mass spectrometric analysis.

6. The imaging analyzer according to claim 1, wherein the predetermined analysis is a mass spectrometric analysis.

* * * * *